United States Patent [19]

Kanamori et al.

[11] 4,443,832
[45] Apr. 17, 1984

[54] SELF-ILLUMINATING ORNAMENT FOR VEHICLES

[75] Inventors: Hiroshi Kanamori, Yokohama; Takehiro Shigeya, Kamakura; Nobumasa Aoki, Tokyo, all of Japan

[73] Assignees: Nissan Motor Co., Ltd., Yokohama City; Marui Industrial Co., Ltd., Tokyo, both of Japan

[21] Appl. No.: 418,428

[22] Filed: Sep. 15, 1982

[30] Foreign Application Priority Data

Sep. 29, 1981 [JP] Japan .................................. 56-152967
Dec. 9, 1981 [JP] Japan ........................... 56-183171[U]

[51] Int. Cl.³ ............................................... F21V 9/16
[52] U.S. Cl. ........................................ 362/84; 362/61;
362/80; 362/311; 362/351; 362/360; 362/375;
362/368; 362/806; 362/808
[58] Field of Search .................... 362/84, 101, 61, 200,
362/806, 74, 80, 812, 808, 375, 360, 368, 104,
311, 351

[56] References Cited

U.S. PATENT DOCUMENTS

| 1,663,392 | 3/1928 | Smith | 362/812 |
|---|---|---|---|
| 2,025,952 | 12/1935 | Levet | 362/812 |
| 2,213,868 | 9/1940 | Lucian | 362/84 |
| 2,291,777 | 8/1942 | Wahlberg | 362/80 |
| 3,096,458 | 7/1963 | Demmy | 362/267 |
| 3,200,524 | 8/1965 | Hendrickson | 362/80 |
| 4,034,213 | 7/1977 | Norris | 362/101 |
| 4,101,955 | 7/1978 | DuNah | 362/104 |
| 4,215,388 | 7/1980 | Reimann | 362/104 |
| 4,332,007 | 5/1982 | Gibstein et al. | 362/103 |
| 4,336,574 | 1/1982 | Goodman | 362/101 |

FOREIGN PATENT DOCUMENTS 627169 9/1961 Canada .................................. 362/74

OTHER PUBLICATIONS

Society of Engineers, Inc. SAE Technical Paper Series, No. 800340, Greenlee et al., "Automotive Application of Electroluminescent Lighting".

Primary Examiner—Stephen J. Lechert, Jr.
Assistant Examiner—Howard J. Locker
Attorney, Agent, or Firm—Lane, Aitken & Kananen

[57] ABSTRACT

An ornament to be attached to a vehicle body such as automobile body to indicate a mark such as the manufacturer's mark for example. The ornament is of the self-illuminating type essentially made up of a base to be attached to an outer part of the vehicle body, a lamp such as an electroluminescent panel supported by the base and a cover which is a one-piece member formed of a transparent material attached to the base so as to entirely cover the lamp with a space therebetween. By processing of its inner side, the cover has a first area which is in a pattern corresponding to the shape of the mark to be indicated and allows the light emitted by the lamp to pass therethrough but in the daylight prevents recognition of the lamp from the outside, and a second portion which is contiguous to the first area and does not allow the light to pass therethrough. The processing of the cover has enabled to exclude partly transparent and/or semitransparent plates disposed between the lamp and the cover in conventional vehicle ornaments of fundamentally the same type, with the effect of improving the appearance of the ornament and reducing the production cost.

15 Claims, 14 Drawing Figures

SELF-ILLUMINATING ORNAMENT FOR VEHICLES

BACKGROUND OF THE INVENTION

This invention relates to an ornament to be attached to a vehicle body such as automobile body to indicate a mark or the like with an ornamental effect, the ornament being of the type having an illuminating lamp therein.

In automobiles and some other vehicles it is customary to ornament the vehicle body with a medal-like or panel-like ornament which indicates a mark such as the manufacturer's mark or the trademark of the vehicle. Vehicle ornaments of this category include self-illuminating ornaments that have come into fashion recently.

A conventional automobile ornament of the self-illuminating type is principally made up of a base to be attached to an outer part of the car body, an illuminating lamp supported by the base, a transparent cover attached to the base to entirely cover the lamp and a metal piece that is shaped into a desired mark and attached to the outer surface of the transparent cover. However, this ornament needs to include additional parts that are disposed between the lamp and the transparent cover to render the lamp invisible from the outside in the daytime and to illuminate only limited areas of the transparent cover in the nighttime such that the illumination relieves the mark against a dark background given by the remaining areas of the cover. The inclusion of such additional parts means a considerable increase in the total number of parts of the ornament and makes the assembling of the ornament troublesome and time-consuming. Furthermore, the existence of these additional parts between the lamp and the cover causes an unnecessary increase in the thickness of the mark-indicating portion of the ornament, which is unfavorable for the aesthetic appearance of the ornament.

SUMMARY OF THE INVENTION

It is an object of the present invention to provide an improved vehicle ornament of the self-illuminating type, which ornament is reduced in the total number of parts, enhanced in productivity and improved in aesthetic appearance and fully serves its purpose both in the daytime and in the nighttime.

Essentially, a vehicle ornament according to the invention comprises a base attachable to an outer part of the vehicle body, an electric lamp supported by the base, and a cover which is a one-piece member formed of a transparent material and is attached to the base so as to entirely cover the lamp with a space therebetween. The inner side of the cover facing the lamp is processed such that the cover has a first area, which is in a pattern corresponding to a mark to be indicated by the ornament and allows light rays emitted by the lamp to pass therethrough but in the daylight prevents recognition of the lamp therethrough from the outside, and a second area which is contiguous to the first area and does not allow the aforementioned light rays to pass therethrough.

It is optional to attach a metal piece formed into the shape of the mark to the outer surface of the cover. When the invention is embodied in an ornament to be stood on the vehicle body, the ornament may comprise two symmetrical covers each of which is processed as stated above to interpose the lamp between the two covers.

It is preferred to use a panel type lamp such as an electroluminescent panel as the illuminating lamp in the ornament.

As a preferred example, the first area of the cover according to the invention is afforded with the above stated properties by locally recessing the inner surface of the cover so as to reduce the thickness of the cover only in the first area and satin-finishing the recessed inner surface, or alternatively applying a semitransparent paint or film to the recessed inner surface. The second area of the cover can be rendered not transparent by applying a shading coating to the inner surface.

A vehicle ornament according to the invention has no extra part between the lamp and the cover. Accordingly this ornament is reduced in the total number of parts compared with the hereinbefore described conventional vehicle ornament of the same type and can be assembled at a reduced labor cost. Furthermore, this ornament can be produced with a reduced thickness of the mark-indicating portion. When the lamp in the ornament is lighted in the nighttime, only the first area of the cover is brightly illuminated with the effect of clearly indicating the mark against the dark background of the second area. In the daytime the first area of the cover appears white against a darker appearance of the second area, so that the mark is clearly recognizable whereas the lamp is invisible.

The present invention will be put into practice mainly in the automobile industry, but of course this invention is useful also in ornamentation of other kinds of vehicles. For automobiles, the invention can be embodied in either an ornament to be placed on an outer surface of the car body, for example on the surface of a center pillar or a rear quarter pillar, or an ornament to be stood on an engine hood panel for example. In the latter case the base of the ornament can be designed as a tiltable or collapsible structure for the safety of pedestrians, and in that case we propose to employ a new mechanism for protecting the wiring for the lamp in the ornament from breaking or damaging upon tilting or collapsing of the ornament base which supports the lamp thereon.

DETAILED DESCRIPTION OF THE INVENTION

Figure 1:
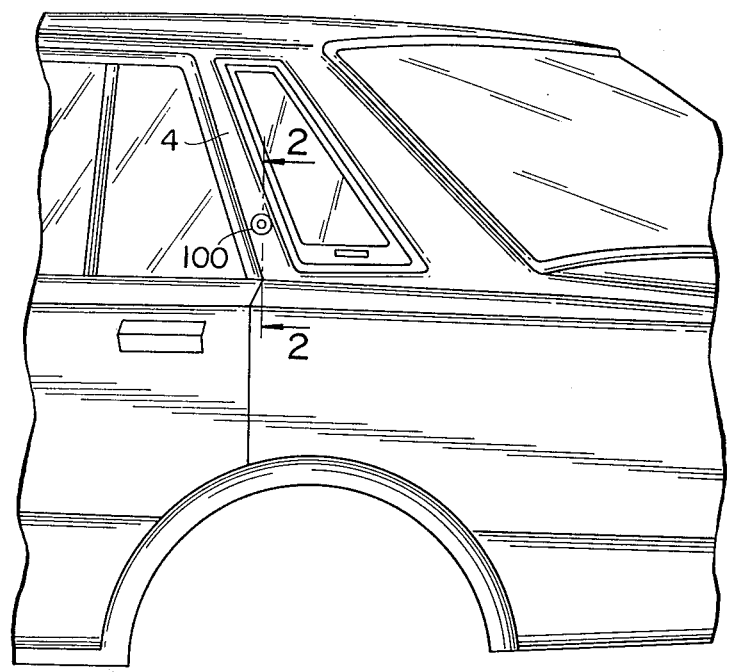
FIG. 1 is a fragmentary and perspective view of an automobile body on which an ornament according to the invention is installed.

Referring to FIG. 1, an embodiment of the present invention is an automobile ornament 100 which is attached to a rear quarter pillar 4 of the car body to indicate, for example, the trademark of the car with an ornamental effect. Prior to detailed description of this ornament 100 with reference to FIG. 5, the construction of a conventional automobile ornament which is analogous to this ornament 100 will be described with reference to FIGS. 2-4 to facilitate understanding of the meaning of the present invention.

Figure 2:
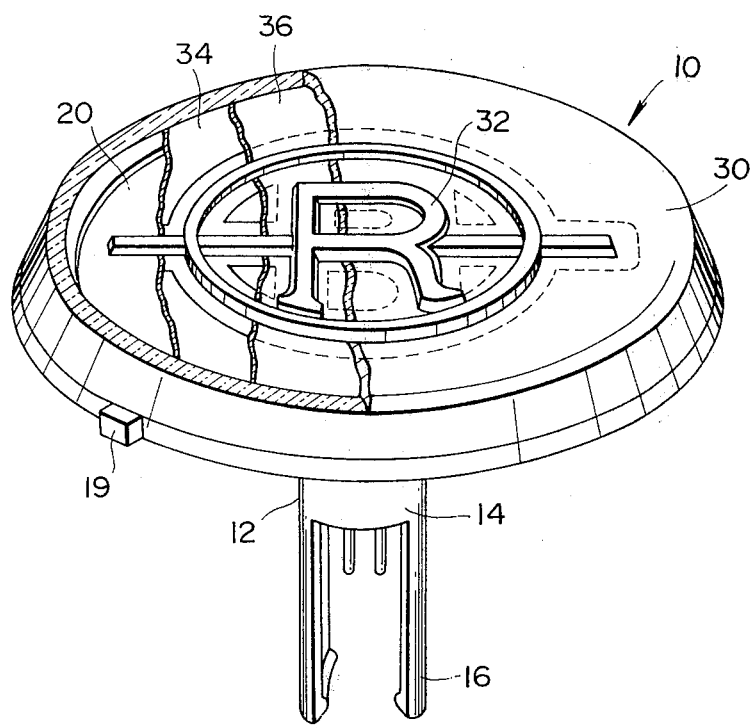
FIG. 2 is a perspective and partly cutaway view of a conventional ornament corresponding to the ornament shown in FIG. 1.
Figure 3:
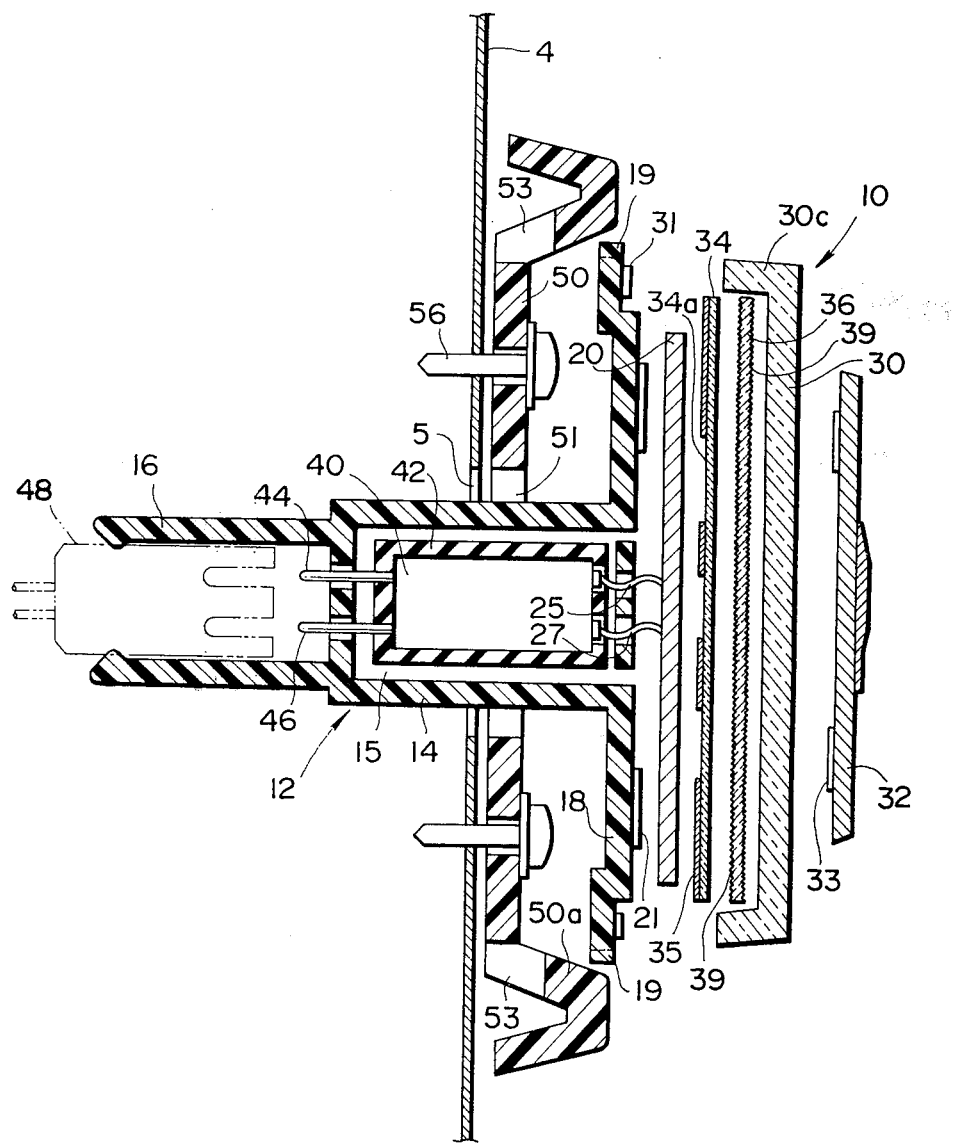
FIG. 3 is a sectional and exploded view of the conventional ornament of FIG. 2.

A conventional automobile ornament 10 shown in FIGS. 2 and 3 is fundamentally made up of a base 12, an illuminating lamp 20 in the form of a circular panel supported on the front end face of the base 12, a dishshaped cover 30 which is formed of a transparent synthetic resin and is fixed in its peripheral region to the front end of the base 12 to entirely cover the lamp 20, and a metal piece 32 which is formed in the manner of openwork into the shape of a character or characters and/or an ornamental pattern and is fixed to the front face of the transparent cover 30.

On the rear side, the base 12 has a cylindrically projecting portion 14 which can be inserted in a hole 5 formed in the rear quarter pillar 4 of the car body. A head portion 18 on the front side of the base 12 can be taken as an annular flange formed at the front end of the cylindrical portion 14. The lamp 20 is attached to the front face of the head portion 18 of the base 12 by using double-faced adhesive tape 21 for example. A typical example of this lamp 20 is a recently developed electroluminescent panel, and in that case AC power is supplied to the lamp 20 from a DC-AC inverter 40 encapsulated in an insulating cover 42 and disposed in a chamber 15 formed in the cylindrical portion 14 of the base 12.

Interposed between the lamp 20 and the transparent cover 30 is a mark-illuminating plate 34, which is a disc made of a transparent synthetic resin and wide enough to cover the entire area to the disc-shaped lamp 20. On the rear side facing the lamp 20, this transparent disc 34 is locally provided with shading coating film 35 so as to leave only selected regions 34a of this disc transparent. The transparent regions 34a in the disc 34 are patterned according to the shape of the aforementioned metal mark 32 such that in the nighttime the mark 32 can be relieved clearly against a bright background produced by the light rays travelled through these transparent regions 34a and the transparent cover 30. Furthermore, a semitransparent disc 36 is interposed between the mark-illuminating disc 34 and the transparent cover 30. This semitransparent disc 36 has approximately the same diameter as the mark-illuminating disc 34, and both the front and rear faces of this disc 36 are satin-finished as indicated at 39. With the interposition of these two discs 34 and 36, the cover 30 is attached at the rear end of its peripheral wall portion 30c to the peripheral region of the head portion 18 of the base 12 by using adhesive 31 for example. The metal mark 32 is fixed to the front face of the cover 30 by using adhesive 33 for example. The semitransparent disc 36 having the satin-finished surfaces 39 causes diffused reflection of light rays incident thereupon through the transparent cover 30 and, therefore, serves the function of making the lamp 20 and the mark-illuminating disc 34 invisible from the outside in the daytime. In the nighttime the semitransparent disc 36 transmits a sufficient portion of the light emitted by the lamp 20 so that the mark 32 can be illuminated in the manner as described above.

Figure 4:
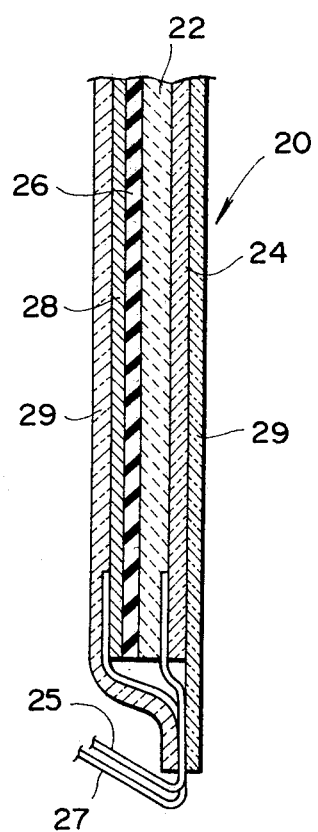
FIG. 4 is a fragmentary and sectional view of an electroluminescent panel used as an illuminating lamp in both the conventional ornament and the ornament according to the invention.

FIG. 4 shows a typical construction of an electroluminescent (EL) panel employed as the lamp 20 in the above described ornament 10. The present invention also utilizes the same EL panel as a preferred embodiment of the lamp comprised in the vehicle ornament.

The EL panel 20 is a laminate essentially constituted of a light-emitting phosphor material 22 in the form of a thin sheet, a transparent electrode layer 24 laid on a front side of the phosphor material sheet 22, a dielectric layer 26 laid on the opposite side of the phosphor material sheet 22 and a back electrode layer 28 laid on the outer surface of the dielectric layer 26. Lead wires 25 and 27 are attached to the front and back electrode layers 24 and 28, respectively, and each side of the laminate is closely covered with a transparent and moisture-proof film 29. The thus constructed EL panel 20 is very thin (e.g. about 1 mm in total thickness) and flexible, and can be produced in various shapes.

In the ornament 10 of FIG. 3, the lead wires 25, 27 of the lamp 20 are connected to the output terminals of the DC-AC inverter 40 confined in the base 12, and output terminals 44 and 46 of the inverter 40 can be connected to a battery (not shown) by inserting a socket 48 attached to a lighting harness (not shown) into a receptacle portion 16 formed at the rear end of the cylindrically projecting portion 14 of the base 12.

The ornament 10 is fixedly attached to the rear quarter pillar 4 by using an annularly shaped holder 50 having a central hole 51, which is brought into alignment with the aforementioned hole 5 in the rear quarter pillar 4, and fixed to the pillar 4 by means of screws 56. The holder 50 has a peripheral wall 50a, and two or more apertures 53 are formed in this wall 50a at suitable angular intervals. The head portion 18 of the base 12 is formed with claw-like radial projections 19 on its periphery such that the base 12 can be fixed to the holder 50 by engagement of the projections 19 with the apertures 53 of the holder 50.

As mentioned above the ornament 10 of FIGS. 2 and 3 serves the purpose either in the daytime and in the nighttime. However, the interposition of the mark-illuminating plate 34 and the semitransparent plate 36 between the lamp 20 and the cover 30 offers unfavorable problems to the industrial production of this ornament. Firstly the use of these auxiliary plates 34, 36 means a considerable increase in the total number of parts, and secondly the assembly of the ornament 10 with the disposition of these two plates 34, 36 is troublesome and time-consuming. Besides, the transparent cover 30 must be made large enough in the height of its peripheral wall 30c to enclose the two plates 34, 36, and therefore the total thickness of the ornament 10 (encluding the cylindrical portion 14) remains relatively large notwithstanding the use of very thin EL panel as the lamp 20. Of course an unnecessarily large thickness is unfavorable for aesthetic appearance of the ornament 10.

Figure 5:
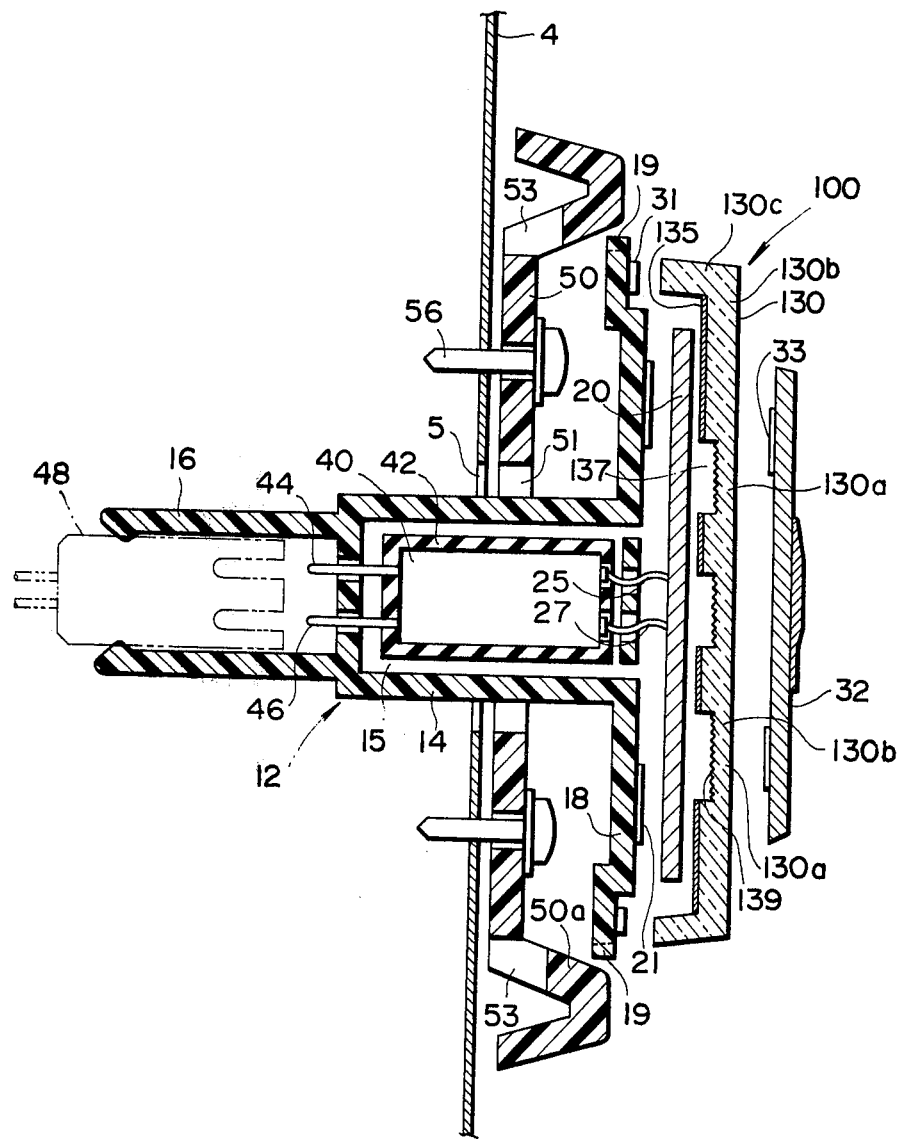
FIG. 5 is a sectional and exploded view of the ornament according to the invention shown in FIG. 1.
Figure 6:
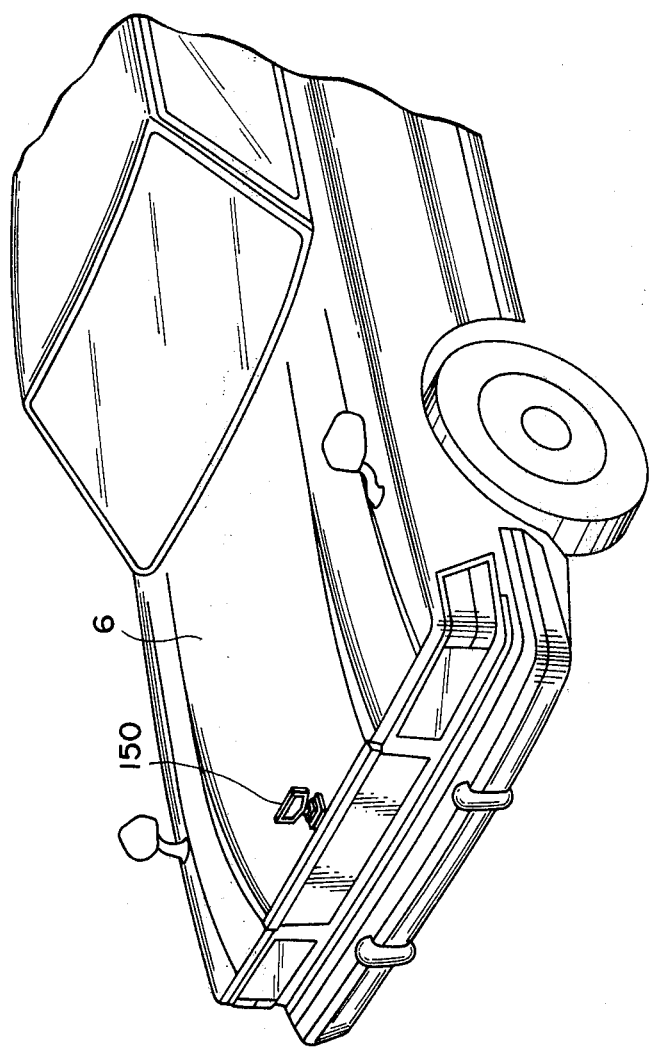
FIG. 6 is a perspective view of a front portion of an automobile on which a front hood ornament according to the invention is installed.

FIG. 5 shows the construction of the automobile ornament 100 embodying the present invention. This ornament 100 is fundamentally of the same type as the above described conventional ornament 10 of FIGS. 2 and 3. The base 12, lamp 20, electrical circuit including the DC-AC inverter 40 and the metal mark 32 are substantially identical with the counterparts of the conventional ornament 10. As can be seen in FIG. 5, the mark-illuminating plate 34 and the semitransparent plate 36 in FIG. 3 are excluded from the novel ornament 100 without adding any alternative or extra part. This ornament 100 has a generally dish-shaped cover 130 which is formed of a transparent synthetic resin. This cover 130 corresponds to the cover 30 in FIG. 3, but this cover 130 differs from the conventional cover 30 in the following points, where resides the primary feature of the present invention.

On the inner or rear side, the major disc-shaped portion of the cover 130 is formed with a plurality of recesses 137 in areas selected according to the pattern of the mark 32 to be attached to the front face of the cover 130, and the bottoms of the respective recesses 137, i.e. rear surfaces of thickness-reduced regions 130a of the cover 130, are satin-finished as indicated at 139. In the remaining areas the rear surface of the disc-shaped portion of the cover 130 is provided with shading coating film 135 so that the relatively thick regions 130b of the cover 130 are rendered not transparent. The cover 130 is attached to the rear end of its peripheral wall 130c to the peripheral region of the head portion 18 of the base 12 by using adhesive 31 for example. The metal piece 32 shaped into a mark is attached to the front face of the cover 130 by using adhesive 33 for example.

The recesses 137 are formed in such areas that in the nighttime the mark 32 can be relieved against a bright background produced by the light rays emitted by the lamp 20 and passed through the relatively thin regions 130a of the cover 130 given by the recesses 137. Therefore, when the lamp 20 is lighted in the nighttime the ornament 100 of FIG. 5 is similar in its ornamental effect to the conventional ornament 10 of FIG. 3 notwithstanding that the mark-illuminating plate 34 and the semitransparent plate 36 in FIG. 3 are excluded from this ornament 100. In the daytime the satin-finished rear surfaces 139 of the relatively thin regions 130a have the effect of rendering these regions 130a transluscent. Owing to this effect and the existence of the shading coating 135 on the rear surfaces of the relatively thick regions 130b, the lamp 20 is invisible from the outside. In the daylight the relatively thin transluscent regions 130a of the cover 130 appear milk-white by reason of diffused reflection of light rays incident upon the satin-finished rear surfaces 139 through these regions 130a, and these regions 130a are present along the peripheries of the character(s) and/or ornamental pattern of the mark 32. Therefore, the mark 32 in the daylight is clearly recognizable and the ornament 100 presents a beautiful appearance.

Owing to the elimination of the mark-illuminating plate 34 and the semitransparent plate 36 needed for the conventional ornament 10 of FIG. 3, the ornament 100 of FIG. 5 becomes considerably higher in productivity and can be made smaller in the thickness of its principal portion located on the front side of the base 12.

Alternative to the satin finish 139 of the rear surfaces of the thickness-reduced regions 130a of the cover 130, use may be made of either a transparent and suitably colored paint or a transparent and suitably colored plastic film to render the same regions 130a translucent.

Referring to FIGS. 6-10, the invention can be embodied also in a hood ornament 150 that is mounted on a hood panel 6 of an automobile.

Figure 10:
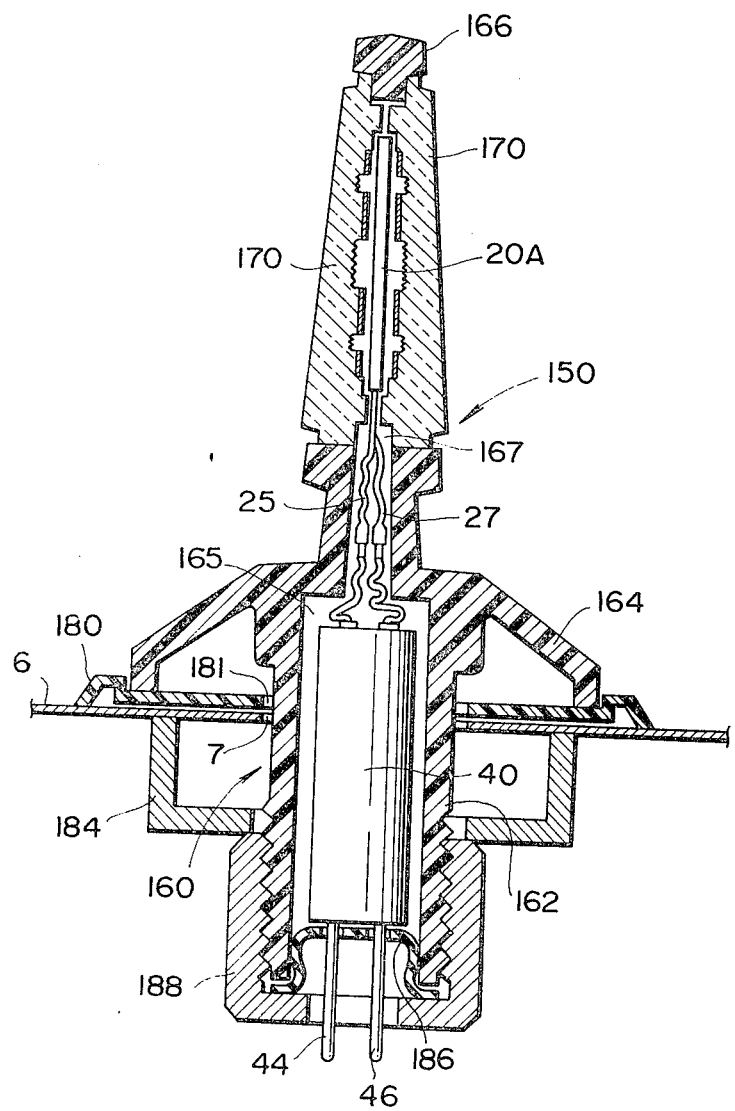
FIG. 10 is a sectional view taken along the line 10—10 in FIG. 7.
Figure 10:
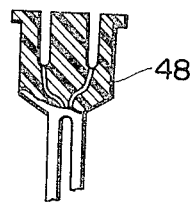

First a general construction of the hood ornament 150 will be described with reference to FIGS. 7 and 10. A base 160 of this ornament 150 has a cylindrically projecting rear portion 162 which can be inserted in a hole 7 formed in the hood panel 6, tapered flange portion 164 to be positioned on the outer side of the hood panel 6 and a rectangular frame portion 166 standing on the flange portion 164. An illuminating lamp 20A in the form of rectangular panel, which is an EL panel in this example, is fitted in the frame 166, and a pair of covers 170 formed of a transparent synthetic resin are fitted in the frame 166 so as to interpose the lamp 20A therebetween. The DC-AC inverter 40 to supply power to the EL panel 20A is disposed in a chamber 165 formed in the cylindrical portion 162 of the base 160, and the leads 25, 27 of the EL panel 20A extend through a space 167 in an intermediate portion of the base 160 between the frame portion 166 and the flange portion 164 and are connected to the output terminals of the inverter 40.

A support 180 having a central hole 181 is placed on the front surface of the hood panel 6 such that the hole 181 comes into alignment with the hole 7 in the hood panel 6, and the cylindrical portion 162 of the base 160 is inserted in the holes 181 and 7 until the rear end face of the flange portion 164 of the base 160 comes into contact with the front face of the support 180. A cushioning seal member 186 is inserted into the rear end of the chamber 165 in the base 160 to support the DC-AC inverter 40, and the ornament 150 is fixed to the hood panel 6 by screwing a nut 188 on a threaded rear end portion of the base 160 until the nut 188 comes into close abutment with a bracket 184 attached to the rear surface of the hood panel 6. The socket 48 of a lighting harness (not shown) can be connected to the input terminal pins 44, 46 of the DC-AC inverter 40 protruding through the hole of the nut 188.

Figure 8:
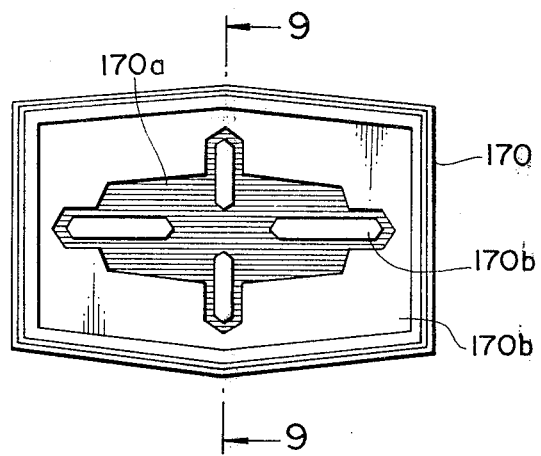
FIG. 8 is an elevational view of a lamp cover in the ornament of FIG. 7.
Figure 9:
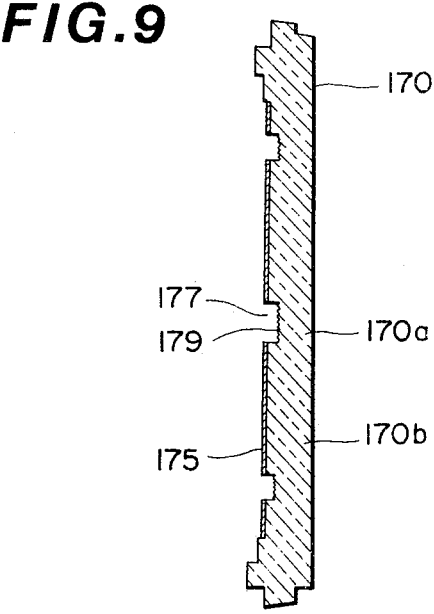
FIG. 9 is a sectional view taken along the line 9—9 in FIG. 8.

Next, the particulars of the covers 170 of this hood ornament 150 will be described with reference to FIGS. 8 and 9. The two covers 170 are symmetrical both in general shape and in the following features. On the inner or rear side, each cover 170 is formed with a recess 177 in the pattern of a desired mark as shown in FIG. 8 by way of example, and the bottom of this recess 177, i.e. rear surface of a thickness-reduced region 170a of the cover 170, is satin-finished as indicated at 179 in FIG. 9. In the remaining regions 170b the rear surface of the cover 170 is provided with shading coating film 175 to render these relatively thick regions 170b not transparent.

This hood ornament 150 has no mark-indicating member on the front faces of the two covers 170. However, the above described processing of the covers 170 results in that these covers 170 serve as mark-indicating elements either in the daytime or in the nighttime. In the daylight the patterned translucent region 170a appears white by the effect of diffused reflection of the light rays at the satin-finished rear surface 179 so that the pattern or mark engraved as the recess 177 is clearly recognizable against a relatively dark appearance of the shaded regions 170b. Of course the lamp 20A is invisible from the outside because of the satin finish 179 and the shading coating 175 on the rear side of each cover 170. In the nighttime, the light rays emitted by the lamp 20A illuminate only the patterned and translucent region 170a of each cover 170, so that this region 170a appears bright against a dark background given by the remaining thick regions 170b of the same cover 170. This means that each cover 170 indicates a bright mark on its front side. Thus, this hood ornament 150 indicates a mark which is clearly recognizable either in the daytime or in the nighttime whether the ornament 150 is viewed in the frontward direction of the car or in the rearward direction. It is optional, however, to replace either one of the two covers 170 in FIGS. 7 and 10 by a completely opaque cover so that the resultant ornament indicates an illuminated mark only on one side thereof. Also in the case of the above described hood ornament 150, it is possible to use either a transparent and suitably colored paint or plastic film as an alternative to the satin finish 179 to render the engraved region 170a transluscent.

The use of an EL panel as the illuminating lamp in the above described embodiments should not be taken as limitative. In the present invention, any of other conventional lamps can be used insofar as the shape and size of the lamp is suitable for the desired ornament, though it is convenient and preferable to use a lamp in the form of relatively thin panel which emits light rays over the entire area thereof.

Figure 11:
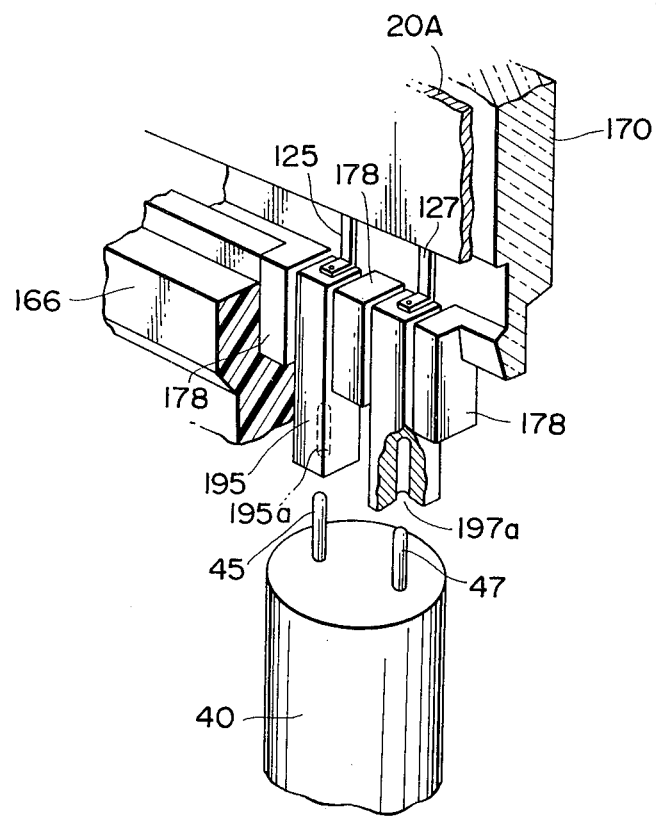
FIG. 11 shows a minor modification of the ornament of FIGS. 7-10 in a fragmentary and partly cutaway view.

In vehicle ornaments according to the invention, the details of the base to support the lamp and the cover(s) and the manner of electrical connection between the lamp and the power circuit which may include a DC-AC inverter can variously be modified. For example, the connection of the lamp 20A and the DC-AC inverter 40 in the ornament 150 of FIGS. 6–10 can be modified in the manner as shown in FIG. 11. In this case the lamp 20A has a pair of rigid terminals 125 and 127, which are fixed to rod-like conductor bodies 195 and 197, respectively. One of the covers 170 of the ornament is integrally formed with three guide pillars 178 in its lower end portion such that the rod-like conductor bodies 195 and 197 extend through the lateral intervals between these guide pillars 178. The DC-AC inverter 40 has pin-like output terminals 45 and 47, and the conductor bodies 195 and 197 are formed with axial bores 195a and 197a, respectively, to serve as sockets or receptacles into which the pin terminals 45 and 47 of the inverter 40 can be inserted.

In some countries it is mandatory to design the automobile parts that are projecting outwardly from the outer panels of the car body, as typified by fender mirrors, so as to readily tilt, collapse or fall down when any of such parts on the running car collides with a pedestrian. Under such regulations the above described hood ornament 150 must be designed as a collapsible or tiltable ornament. There are various ways of modifying the base 160 of this hood ornament 150 into a tiltable or collapsible structure, but we prefer to employ a collapsible base construction illustrated in FIGS. 12–14 with a view to preventing breaking or damage of the electrical circuit for the lamp 20A in the modified ornament upon collapsing of the ornament.

Figure 12:
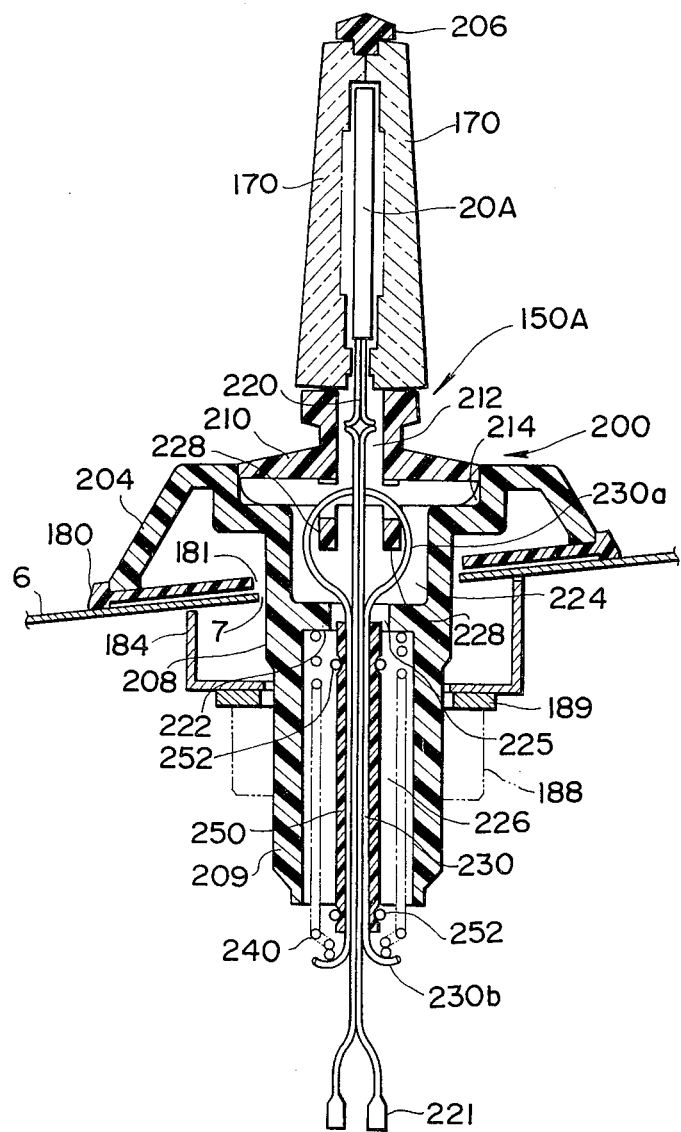
FIG. 12 is a sectional view of a collapsible hood ornament according to the invention.

Referring first to FIG. 12, the collapsible hood ornament 150A has a base 200 which is made up of two members. The first member of the base 200 has a cylindrically projecting rear portion 208, which can be inserted in the hole 7 in the hood panel 6, and a tapered flange portion 204 to be positioned on the outer side of the hood panel 6. The second member has a rectangular frame portion 206 corresponding to the frame 166 in FIG. 7 and a frame support portion 210 which is fitted into a recess 214 formed in a central region of the front wall of the flange portion 204. The panel-shaped lamp 20A and the two covers 170 are designed and fitted in the frame portion 206 in the manner as described with reference to FIGS. 7–10. A pair of electrical cables 220 extend downwards from the lamp 20A through a central hole 212 in the frame support portion 210 of the base 200.

Figure 7:
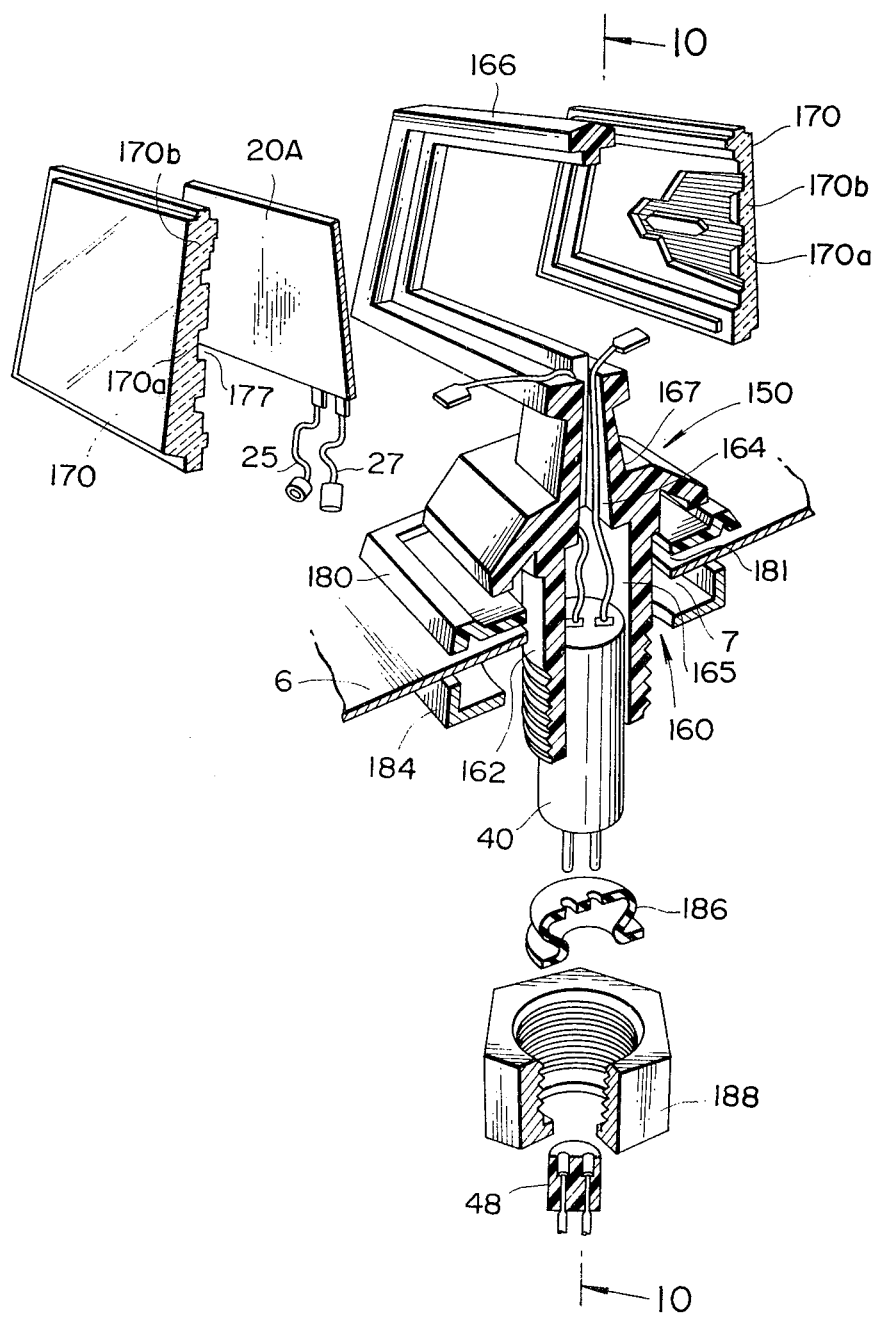
FIG. 7 shows the hood ornament in FIG. 6 in a partly exploded and cutaway view.

The ornament support 180 described with reference to FIG. 7 is placed on the front surface of the hood panel 6 with the central hole 181 of the support 180 in alignment with the hole 7 in the hood panel 6, and the cylindrical portion 208 of the base 200 is inserted in the holes 181 and 7 until the rear end of the flange portion 202 comes into contact with the front face of the support 180. In this state this member of the base 200 is fixed to the hood panel 6 to which the bracket 184 is attached in advance by screwing the nut 188 on a threaded end portion 209 of the base 200 with the disposition of a washer 189 on the bracket 184. In this hood ornament 150A, the DC-AC inverter 40 (not shown in FIGS. 12–14) for the EL lamp 20A is not disposed in the ornament body 200 because the interior spaces in the cylindrical portion 208 and the flange portion 204 of the base 200 are utilized in making this hood ornament 150A collapsible in the following manner.

In the flange portion 204 of the base 200 there is a space 224 which is contiguous to and in axial alignment with the aforementioned recess 214 located above, and the cylindrical rear portion 208 of the base is formed with a cylindrical bore 226 which is in axial alignment with the space 224. There is a partition 222 between the upper space 224 and the lower bore 226, but this partition 222 has a central hole 225 which is wide enough to allow the cables 220 to freely pass therethrough. The space 224 is greater in axial length or depth than the upper recess 214 but is considerably smaller in cross-sectional area than the recess 214.

Figure 14:
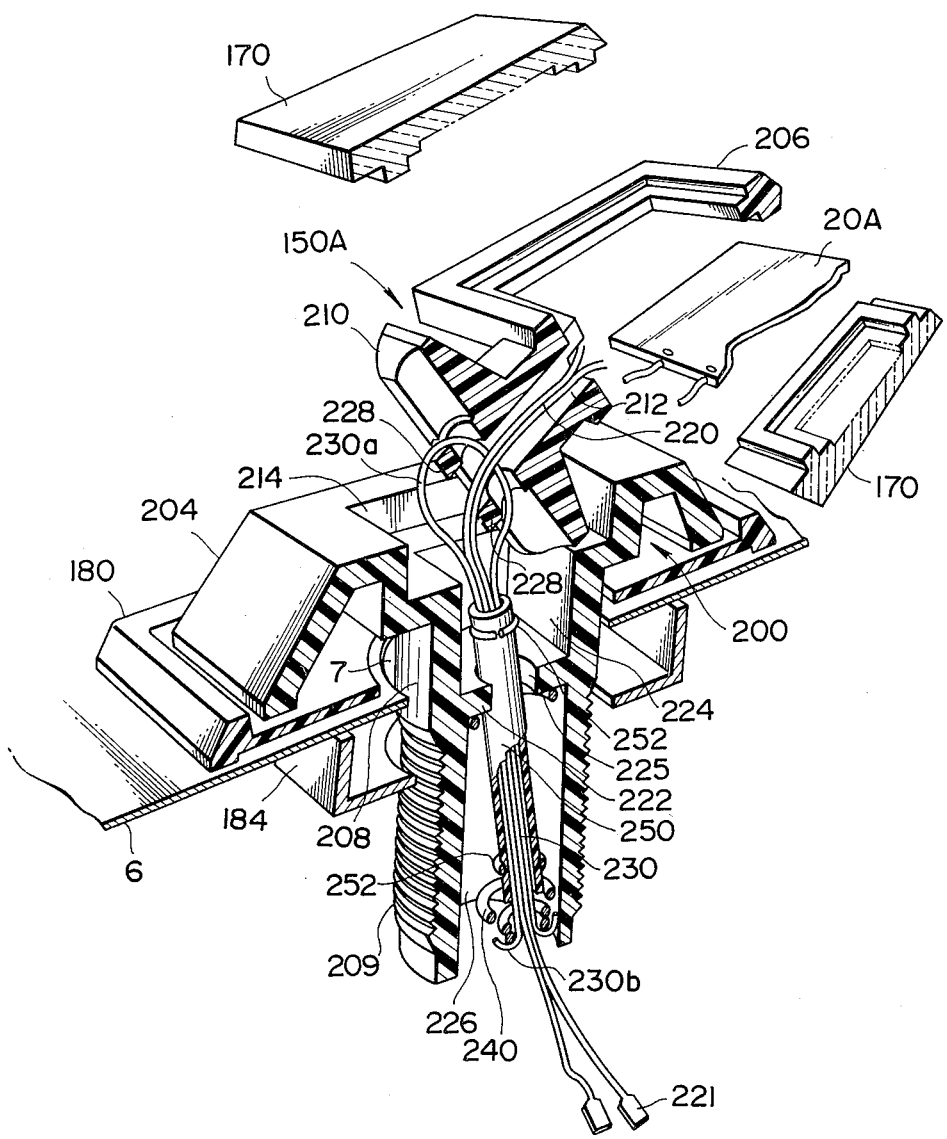
FIG. 14 is a perspective, cutaway and partly exploded view of the ornament of FIGS. 12 and 13 in the same state as in FIG. 13.

In the bottom region inserted in the recess 214, the frame support portion 210 of the second member of the base 200 has chamfered and rounded corner surfaces as can clearly be seen in FIG. 14 so that this member can make a tilting or swiveling movement when a mechanical force greater than a certain magnitude is exerted on its frame portion 206 or the covers 170 fitted therein. Furthermore, the bottom of the frame support portion 210 is formed with two rounded hooks 228 which are arranged symmetrical with respect to the cables 220 extending from the lamp 20A and protrude into the space 224 beneath the recess 214.

The base member having the frame portion 206 and the frame support portion 210 is held upright by means of a combination of a wire 230 and a coil spring 240. The wire 230 is bent double so as to form a ring 230a in the middle. The straight portion of the bent wire 230 is inserted into the cylindrical bore 226 in the fixed member of the base 200 from the upside through the hole 225 of the aforementioned partition 222, and the wire 230 is hung on the hooks 228 of the frame support portion 210 of the movable member by using the ring-shaped portion 230a. The two ends 230b of the bent wire 230 are slightly bent laterally, and the coil spring 240 is inserted into the cylindrical bore 226 of the fixed base member and held in a compressed state between the lower surface of the partition 222 and the bent ends 230b of the wire 230. Thus, the wire 230 is kept in a state pulled downward, and accordingly the movable member having the frame portion 206 and the frame support portion 210 if kept upright and pulled downward.

In advance of the installation of the wire 230 and the spring 240 into the ornament base 200, the straight portion of the bent wire 230 and the cables 220 extending from the lamp 20A are inserted into a protective sleeve 250 of which the length is nearly equal to or somewhat greater than the axial length of the cylindrical bore 226 in the base 200. In the illustrated embodiment this sleeve 250 is formed of a synthetic resin, but alternatively the sleeve may be formed of a sheet metal. In the upper and lower regions, the sleeve 250 is circumferentially clamped by metal clips 252 such that both the sleeve 250 and the cables 220 move together with the wire 230. The outer diameter of the sleeve 250 is smaller than the diameter of the hole 225 in the partition 222 so that the sleeve 250 can loosely pass through this hole 225. After completion of the assemblage shown in FIG. 12, the terminals 221 at the extended ends of the cables 220 are connected to the DC-AC inverter or a harness extending from the inverter.

Figure 13:
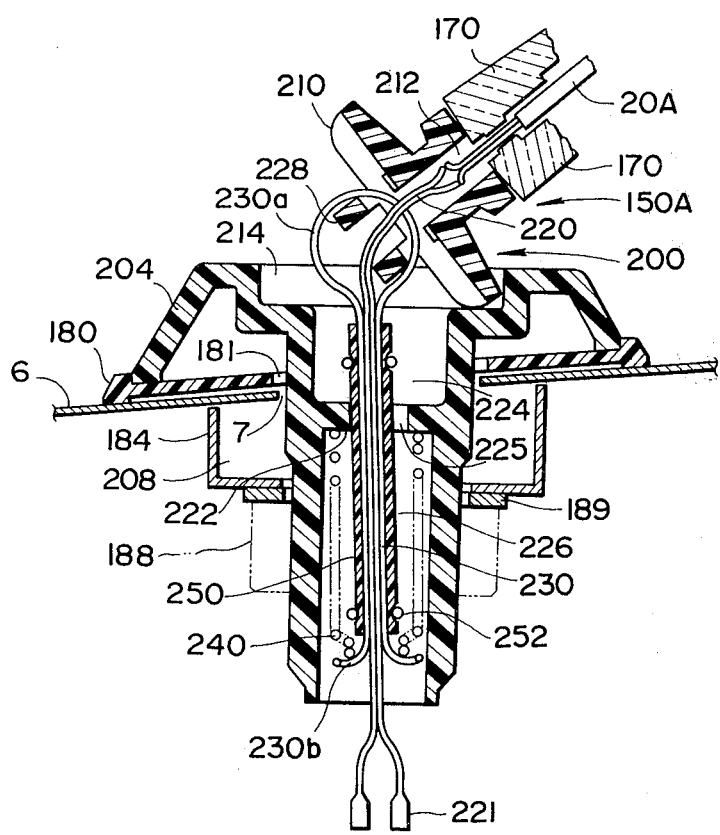
FIG. 13 shows the ornament of FIG. 12 in the same view but in a collapsing state.

Referring to FIGS. 13 and 14, when the movable base member supporting the lamp 20A and the covers 170 tilts or falls down by the action of an external force, the wire 230 hung on the hooks 228 of the movable base member is pulled upward against the force of the spring 240. Then the protective sleeve 250 moves upward together with the wire 230 through the hole 251 in the partition 222, and the cables 220 held by the sleeve 250 move upward without moving relative to the wire 230. Accordingly, in this hood ornament 150A there is no possibility of entwining of the cables 220 with the wire 230 upon a tilting or collapsing movement of the upper part of the ornament. Furthermore, the protective sleeve 250 prevents the cables 220 from contacting the partition 222 or any other wall of the fixed base member during the upward movement of the cables 220. In this collapsible hood ornament 150A, therefore, the possibility of breaking or damaging of the cables 220 by friction or by forcible pulling under an entangled or entwined state is completely eliminated, so that the cables 220 and, hence, the collapsible hood ornament 150A are greatly improved in durability.

Alternative to the illustrated protective sleeve 250, it is possible to use a protective sleeve which is formed with axial slits so as to exhibit a spring action in the radially inward direction. In that case the clips 252 used in the illustrated embodiment become unnecessary.

What is claimed is:

1. An ornament for a vehicle to indicate a decorative or identifying mark, the ornament comprising:
a base attachable to an outer part of the vehicle body;
an electric lamp supported by said base; and
a cover which is a one-piece member formed of a transparent material and is attached to said base so as to entirely cover said lamp with a space therebetween, the inner side of said cover facing said lamp being processed such that said cover has a first area, which is in a pattern corresponding to the shape of said mark and allows light rays emitted by said lamp to pass therethrough but in the daylight prevents recognition of said lamp therethrough from the outside, and a second area which is contiguous to said first area and does not allow said light rays to pass therethrough, said inner side of said cover being recessed only in said first area to reduce the thickness of said cover in said first area.

2. A vehicle ornament according to claim 1, wherein the recessed inner surface of said cover is satin-finished.

3. A vehicle ornament according to claim 1, wherein the recessed inner surface of said cover is coated with a semitransparent and colored film.

4. A vehicle ornament according to claim 2 or 3, wherein the inner surface of said cover is coated with a shading coating film only in said second area.

5. A vehicle ornament according to claim 4, further comprising another cover which is symmetrical with said cover and identically processed so as to have said first area and said second area, said another cover being attached to said base so as to interpose said lamp between said cover and said another cover.

6. A vehicle ornament according to claim 4, further comprising a metal member which is formed into the shape of said mark and is attached to the outer surface of said cover such that the peripheries of said metal member are located in said first area of said cover.

7. A vehicle ornament according to claim 1, wherein said lamp is in the form of a panel which emits light substantially over the entire area thereof.

8. A vehicle ornament according to claim 7, wherein said lamp is an electroluminescent panel.

9. A vehicle ornament according to claim 8, wherein said base is formed with a chamber to receive therein a DC-AC inverter which supplies power to said electroluminescent panel.

10. A vehicle ornament according to claim 7, wherein said base and said cover are shaped such that when the ornament is attached to said outer part of the vehicle body said lamp and said cover of the ornament are held generally parallel to the outer surface of said outer part of the vehicle body.

11. A vehicle ornament according to claim 7, wherein said base and said cover are shaped such that when the ornament is attached to said outer part of the vehicle body said lamp and said cover of the ornament are held generally upright and generally normal to the outer surface of said outer part of the vehicle body.

12. A vehicle ornament according to claim 11, wherein said base has a pillar-like portion and a frame portion supported on said pillar-like portion, said lamp and said cover being fitted in said frame portion of said base.

13. A vehicle ornament according to claim 12, further comprising another cover which is symmetrical with said cover and identically processed so as to have said first area and said second area, said another cover being fitted in said frame portion of said base so as to interpose said lamp between said cover and said another cover.

14. A vehicle ornament according to claim 11, wherein said base comprises a first member which can be fixed to said outer part of the vehicle body and is formed with a recess in an upper end portion thereof and a second member which holds said lamp and said cover and has a lower end portion which is swivelably fitted into said recess in said first member, the ornament further comprising means for normally holding said second member of said base generally upright and for allowing said second member to swivelingly move relative to said first member of said base upon exertion of a mechanical force on said second member.

15. A vehicle ornament according to claim 14, wherein said first member of said base is formed with a throughhole contiguous to said recess, said lower end portion of said second member of said base having an inner space contiguous to said through-hole in said first member and being formed with at least one hook protruding into said through-hole, said means comprising a wire which is bent and hung on said hook of said second member of the base and extended through said through-hole in said first member of said base, a spring installed in said through-hole so as to keep said wire pulled downwards, and a sleeve-like protector through which extend a major length of said wire and an intermediate portion of electrical cables connected to said lamp, said sleeve-like protector clamping said wire and said cables such that when said second member of said base makes a swiveling movement said wire, said cables and said sleeve-like protector are pulled up altogether without moving relative to one another.

* * * * *